J. I. KINSEY.
Car Axle-Boxes.
No. 147,652.
Patented Feb. 17, 1874.
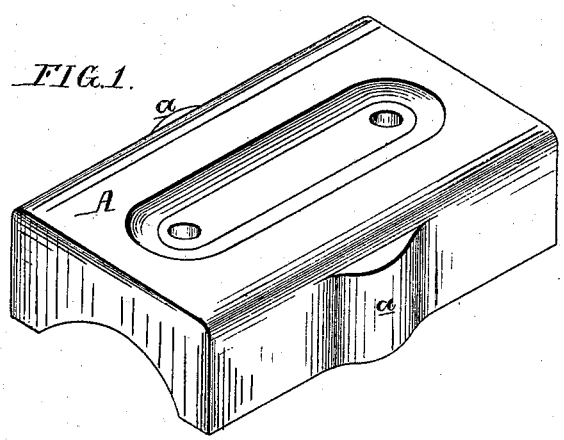
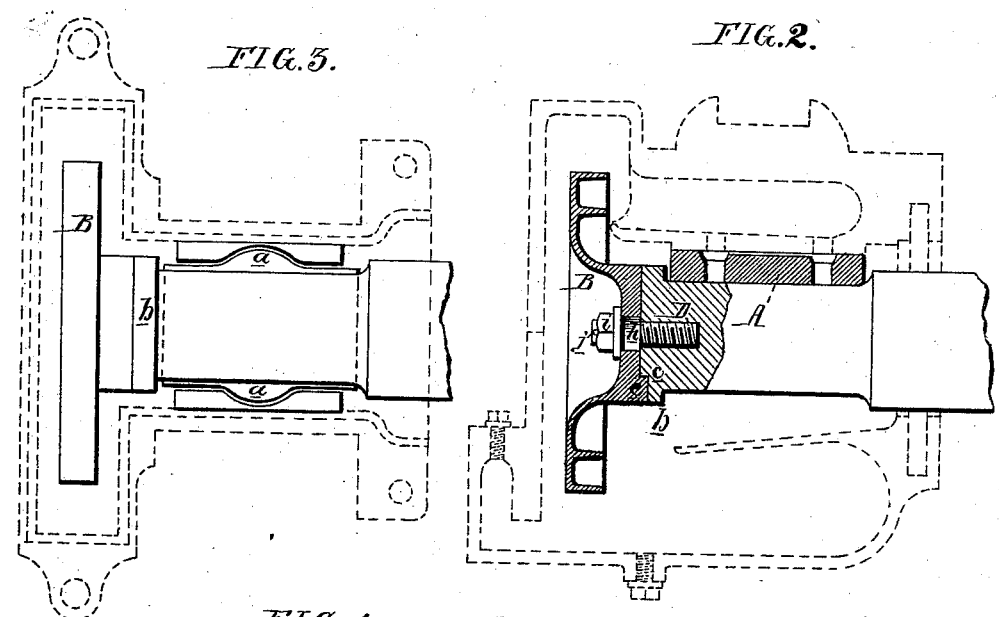
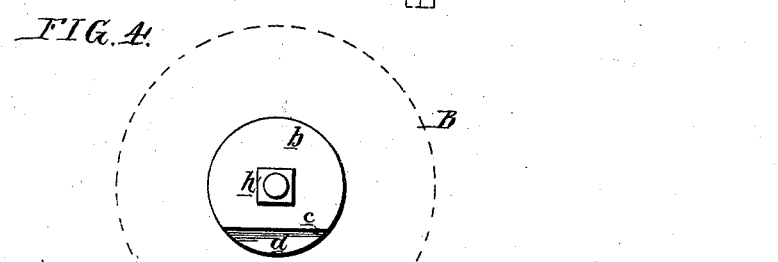

UNITED STATES PATENT OFFICE.

JOHN I. KINSEY, OF SOUTH EASTON, PENNSYLVANIA.

IMPROVEMENT IN CAR-AXLE BOXES.

Specification forming part of Letters Patent No. 147,652, dated February 17, 1874; application filed February 11, 1873.

*To all whom it may concern:*

Be it known that I, JOHN I. KINSEY, of South Easton, county of Northampton, State of Pennsylvania, have invented certain Improvements in Journal-Boxes, of which the following is a specification:

The object of my invention is to enable a flanged disk, for conveying lubricating material from the lower to the upper portion of the box, to be securely attached to the end of the journal. I accomplish this object in a manner which I will now proceed to describe, reference being had to the accompanying drawing, in which—

Figure 1 is a perspective view of the brass or bearing; Fig. 2, a vertical section of the box; Fig. 3, an inverted plan view of the upper section of the box, with the journal and bearing in position; and Fig. 4, an end view of the journal and conveying-disk.

The brass or bearing A is fitted somewhat loosely within the box, so as to give it a slight lateral play, and on opposite sides of the said bearing are rounded projections $a$, adapted to corresponding recesses in the sides of the box, thus permitting both the journal and bearing to vibrate laterally to a limited extent within the box in turning sharp curves, &c., consequently reducing the friction, and preventing the cutting and wearing away of either the bearing or box and the heating of the journal.

In the box illustrated in the drawing, the lubricating material is passed through the bearing to the journal, and to prevent leakage between the said bearing and box I propose to grind the adjoining faces of both, so as to obtain a perfectly tight joint.

The lubricating material is conducted from the bottom to the top of the box by means of a flanged disk, B, secured to and rotating with the journal.

Such disks have heretofore been secured to the end of the journal in a very imperfect manner, either permanently or insecurely—an objection it is one of the objects of my invention to overcome.

I plane off a portion of the face of the collar $b$ at the end of the journal, so as to form a transverse shoulder, $c$, and recess $d$, and to this shoulder and recess I adapt a corresponding projection, $e$, on the hub of the disk. A bolt, D, is screwed into the end of the journal, is squared at $h$, where it passes through the disk, and is provided with a nut, $i$, locked by means of a split key, $j$, or equivalent device.

The screw-bolt D is first screwed into the end of the journal; the disk B is then applied to the square portion of the screw-bolt; the nut $i$ is then placed upon the projecting threaded end of the bolt, and turned until the disk is securely confined to the end of the journal.

The bolt is prevented from becoming unscrewed by the disk, to which its square portion is adapted, and the disk is prevented from turning independently of the journal by the shoulder $b$ of the latter, the said disk being thus securely attached to the journal, from which, however, it can be readily disconnected when necessary.

I claim as my invention—

The journal, with its shoulder $c$ and bolt D, having a square portion, $h$, in combination with the disk B, having shoulder $e$ and the nut $i$, adapted to the threaded outer end of the bolt, all as and for the purpose set forth.

In testimony whereof I have signed my name to this specification in the presence of two subscribing witnesses.

J. I. KINSEY.

Witnesses:
SAMUEL ARNDT,
WILLIAM H. CHESTON.